US008958534B2

(12) United States Patent
Bodman

(10) Patent No.: US 8,958,534 B2
(45) Date of Patent: Feb. 17, 2015

(54) METHODS, SYSTEMS AND COMPUTER READABLE MEDIA FOR FACILITATING A REMOTE DEPOSIT TO A PREPAID CARD ACCOUNT

(71) Applicant: MasterCard International Incorporated, Purchase, NY (US)

(72) Inventor: Ryan Patrick Bodman, Brooklyn, NY (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 13/943,758

(22) Filed: Jul. 16, 2013

(65) Prior Publication Data

US 2015/0026052 A1    Jan. 22, 2015

(51) Int. Cl.
*H04M 15/00* (2006.01)
*G06Q 20/28* (2012.01)
*G06Q 20/10* (2012.01)

(52) U.S. Cl.
CPC .............. *G06Q 20/28* (2013.01); *G06Q 20/108* (2013.01)
USPC ................................... 379/114.16; 379/114.2

(58) Field of Classification Search
USPC ................. 379/114.16, 114.2; 705/39, 40, 42
See application file for complete search history.

(56) References Cited

U.S. PATENT DOCUMENTS

| 7,337,947 | B1* | 3/2008 | Swanson, Sr. ................. 235/375 |
| 2013/0138563 | A1* | 5/2013 | Gilder et al. .................... 705/44 |
| 2013/0198071 | A1* | 8/2013 | Jurss ............................... 705/42 |
| 2014/0108239 | A1* | 4/2014 | Bowman et al. ................. 705/39 |
| 2014/0108253 | A1* | 4/2014 | Hartmaier ........................ 705/44 |

OTHER PUBLICATIONS

"Original Credit Transaction (OCT)", Visa Online, https://developer.visa.com/vpp/docs/methods/OCT, pp. 1-13 (Downloaded from the Internet Jul. 16, 2013).
"Financial transaction card originated messages—Interchange message specifications—Part 1: Messages, data elements and code values," ISO 8583, pp. 1-94 (2003) (Part 1 of 2).
"Financial transaction card originated messages—Interchange message specifications—Part 1: Messages, data elements and code values," ISO 8583, pp. 95-193 (2003) (Part 2 of 2).

* cited by examiner

*Primary Examiner* — Quoc D Tran
(74) *Attorney, Agent, or Firm* — Jenkins, Wilson, Taylor & Hunt, P.A.

(57) ABSTRACT

Methods, systems, and computer readable media for facilitating a remote deposit to a prepaid card account are disclosed. In one example, the method includes receiving, via an application programming interface (API) supported by a central switch node, a web based service message containing a load request from an acquiring entity. The method further includes utilizing, at the central switch node, the load request to identify an issuing entity that hosts a prepaid card account associated with the load request from among a plurality of issuing entities and communicating the load request from the central switch node to the issuing entity.

25 Claims, 5 Drawing Sheets

400

```
<?xml version="1.0" encoding="UTF-8"?>
<RepowerRequest>
    <!--Transaction related information-->
    <TransactionReference>2000000001010101011</TransactionReference>
    <CardNumber>1234567890123452</CardNumber>
    <TransactionAmount>
        <Value>5000</Value>
        <Currency>840</Currency>
    </TransactionAmount>
    <LocalDate>1230</LocalDate>
    <LocalTime>092435</LocalTime>
    <!--Card Acceptor Information-->
    <Channel>M</Channel>
    <ICA>003674</ICA>
    <ProcessorId>9000000442</ProcessorId>
    <RoutingAndTransitNumber>123456789</RoutingAndTransitNumber>
    <MerchantType>6532</MerchantType>
    <CardAcceptor>
        <Name>Prepaid Card Load Store</Name>
        <City>St Charles</City>
        <State>MO</State>
        <PostalCode>63301</PostalCode>
        <Country>USA</Country>
    </CardAcceptor>
</RepowerRequest>
```

```
<?xml version="1.0" encoding="UTF-8" standalone="yes"?>
<Repower>
    <RequestId>11507</RequestId>
    <TransactionReference>4239914003021501211</TransactionReference>
    <TransactionHistory>
        <Transaction>
            <Type>REPOWERPAYMENT</Type>
            <SystemTraceAuditNumber>074406</SystemTraceAuditNumber>
            <NetworkReferenceNumber>412370594</NetworkReferenceNumber>
            <SettlementDate>0703</SettlementDate>
            <Response>
                <Code>00</Code>
                <Description>Approved or completed successfully</Description>
            </Response>
            <SubmitDateTime>2012-07-02T12:17:46Z</SubmitDateTime>
        </Transaction>
    </TransactionHistory>
    <!-- Optional -->
    <AccountBalance>
        <Value>7250</Value>
        <Currency>840</Currency>
    </AccountBalance>
</Repower>
```

FIG. 5

METHODS, SYSTEMS AND COMPUTER READABLE MEDIA FOR FACILITATING A REMOTE DEPOSIT TO A PREPAID CARD ACCOUNT

TECHNICAL FIELD

The subject matter described herein relates to the processing of electronic fund transactions. More particularly, the subject matter described herein relates to systems, methods, and computer readable media for facilitating a remote deposit to a prepaid card account.

BACKGROUND

Presently, prepaid check deposit networks exist that enable a cardholder to electronically add funds to a prepaid card account. While the load process supported by such prepaid systems enables prepaid cardholders to convert deposited checks into prepaid card funds in a convenient manner, the initial integration between check guarantors and issuing entities, such as banks, can be time consuming and require a significant investment.

Traditionally, acquiring entities, including third party processors such as check guarantor services, communicate with issuing entities (or "issuers") via a central switch node or a central network. Specifically, the acquiring entities (or "acquirers") are required to connect to the central switch node or network through an interface processor that transmits transaction messages in ISO 8583 format. Operating the interface processor can be challenging for acquiring entities as it requires on-going maintenance and support that can become costly. As a result, check guarantors will continue to pursue direct connections with issuing entities as the benefit of leveraging the existing central network is limited.

In light of these disadvantages, there exists a need for improved systems, methods, and computer readable media for facilitating a remote deposit to a prepaid card account.

SUMMARY

According to one aspect, the subject matter described herein relates to, methods, systems, and computer readable media for facilitating a remote deposit to a prepaid card account. In one embodiment, the method includes receiving, via an application programming interface (API) supported by a central switch node, a web based service message containing a load request from an acquiring entity. The method further includes utilizing, at the central switch node, the load request to identify an issuing entity that hosts a prepaid card account associated with the load request from among a plurality of issuing entities and communicating the load request from the central switch node to the issuing entity.

The subject matter described herein may be implemented in hardware, software, firmware, or any combination thereof. As such, the terms "function", "node", or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 4 depicts an exemplary load request message according to an embodiment of the subject matter described herein; and FIG. 5 depicts an exemplary response message according to an embodiment of the subject matter described herein.

DETAILED DESCRIPTION

Figure 1:
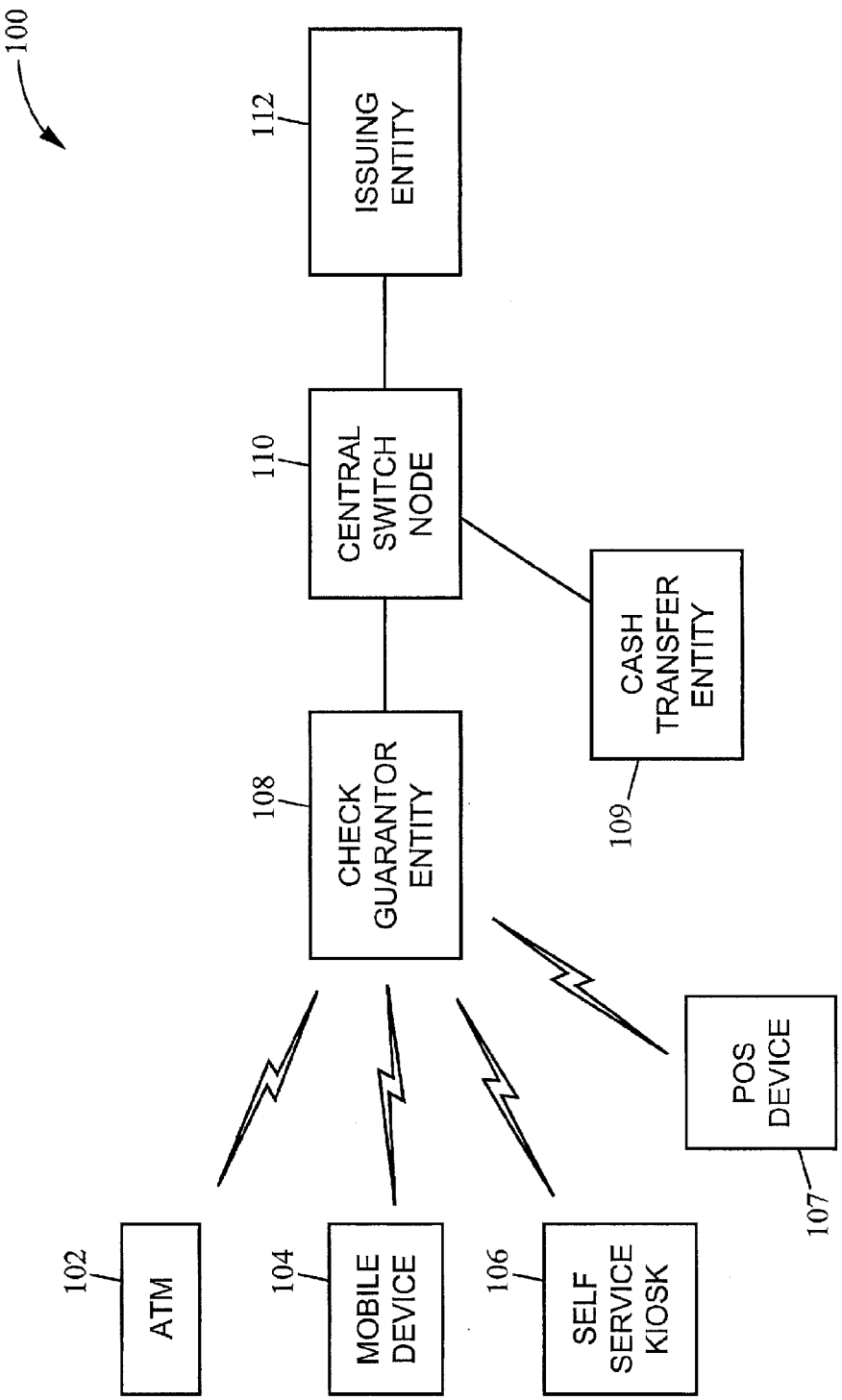
FIG. 1 is a block diagram illustrating an exemplary system for facilitating a remote deposit to a prepaid card account according to an embodiment of the subject matter described herein.

In accordance with the subject matter disclosed herein, methods, systems, and computer readable media for facilitating a remote deposit to a prepaid card account are disclosed. The present subject matter provides cardholders with a convenient way to deposit monetary funds to a prepaid card account. For example, the present subject matter utilizes a prepaid loading system that leverages an existing network infrastructure (e.g., a MasterCard Network infrastructure or "MasterCard payment network") that provides a connection between to connect different points of deposit (e.g., a merchant point of sale, an automated teller machine (ATM), a mobile device, a cash transfer entity, etc.) and various issuing entities, such as banks and credit card companies. More specifically, a central switch node or network associated with an entity such as MasterCard may be leveraged along with the entity's existing connection to issuers to support a prepaid card load transaction. Thus, by establishing a connection to a central switch node, a check guarantor entity can eliminate the need to directly integrate with issuer processors on an individual basis. Furthermore, the present subject matter may utilize existing processing and transaction codes of the aforementioned existing network infrastructure to conduct remote deposits in an efficient manner.

As a brief overview, the present subject matter may be utilized by a prepaid cardholder to deposit funds, such as a cash deposit or a check deposit, into a prepaid card account. For example, prepaid cardholder may decide to load a particular amount on a prepaid card by providing an image of a check to a check guarantor entity.

Once the image of the check is received, the check guarantor entity processes the information and makes a determination as to whether the check should be approved or rejected. If the check is approved, the check guarantor entity may send to a central switching node a load request indicating the guaranteed check amount to be deposited. In one embodiment, the load request includes a "Payment To" transaction message that may be utilized within a MasterCard network infrastructure and/or system. Although the following disclosure describes the use of a "Payment To" load request message, other types of load requests may be utilized in other payment networks, systems, and/or infrastructures without departing from the scope of the present subject matter. For example, the load request may include an original credit transaction (OCT) message that is utilized within a VISA network infrastructure and/or system.

In some embodiments, the load request is communicated to the central switching node as a web based service message via an application programming interface (API) supported by the central switch node. Upon receiving the load request, the central switching node utilizes information contained in the received request message to identify an appropriate issuing entity to forward the load request. After determining the appropriate issuing entity destination, the central switching node may communicate the load request. The issuing entity subsequently receives and processes the load request. Upon approving of the load request, the issuing entity may credit the prepaid cardholder's account balance and generate a response message containing the updated account information. The response message may be communicated, via the central switch node, to the original acquiring entity. In one embodiment, the response message indicates that the check was approved and deposited. The acquiring entity may in turn forward the response message to the original deposit point used by the prepaid cardholder.

The above mentioned transaction overview of conducting a deposit to a prepaid card account may be conducted using prepaid loading system that leverages an existing network infrastructure that provides a connection between different points of deposit and various issuing entities. For example, FIG. 1 depicts an exemplary prepaid loading system 100 that includes a plurality of check deposit points (e.g., an automated teller machine (ATM) 102, a mobile device 104, a self-service kiosk 106, and a point of sale device 107), a plurality of acquiring entities (e.g., a check guarantor entity 108 and a cash transfer entity 109), a central switch node 110, and an issuing entity 112. As used herein, an "acquiring entity" may include any entity that receives a prepaid card account deposit from a customer or user. The acquiring entity may also be configured to utilize an API to communicate with central switch node 110 (as described below). Examples of acquiring entities may include Chexar Networks, Green Dot, InComm, FIS, Western Union, and other similar entities. Similarly, as used herein, an "issuing entity" may include an entity that is licensed by an entity associated with central switch node 110 (e.g., MasterCard International) and may also be authorized to issue prepaid cards bearing the service marks of the central switch node entity (e.g., MasterCard). Examples of issuing entities include bank entities (e.g., Meta Bank, Citibank, The Bancorp Bank, U.S. Bank, etc.), program manager entities (e.g. program marketer entities), credit card companies, and the like.

In one embodiment, a prepaid cardholder may utilize any of check deposit points 102-106 to initiate the process of depositing the check amount to a prepaid card account. For example, a prepaid cardholder may utilize a camera equipped on mobile device 104 (e.g., a cellular phone, a smartphone, a personal digital assistant, a tablet computer, or any other portable computing device) to capture the image of a check to be deposited. The image of the check may then be wirelessly communicated from mobile device 104 to check guarantor entity 108. For example, mobile device 104 may communicate with check guarantor entity 108 using WiFi, cellular/wireless communications (e.g., 3G, 4G, long term evolution (LTE), etc.), or any other emerging wireless communications. In a similar manner, ATM 102 and self-service kiosk 106 may be utilized by a prepaid cardholder to provide a check image to check guarantor entity 108 via either a wired or wireless manner. Although the following example and the description is directed to utilizing a check guarantor entity 108 to facilitate a check deposit to a prepaid card account, other methods for loading funds may also be conducted without departing from the scope of the present subject matter. For example, a cash transfer entity 109 (e.g., such as Western Union) may be used by a prepaid cardholder to initiate the depositing of cash funds to a prepaid card account.

In some embodiments, check guarantor entity 108 may include a server or other computer device that is configured to receive check images from any check deposit point (e.g., any one of deposit points 102-106). Check guarantor entity 108 may also be associated with a risk management entity (e.g., Chexar Networks, Inc.) that is tasked with determining the validity of a received check image. For example, check guarantor entity 108 may utilize proprietary risk assessment and determination algorithms to ascertain whether a received check image should be approved or denied. If the check image is approved and/or validated, then check guarantor entity 108 generates a message containing a request to load the check amount (e.g., a load request) to an appropriate prepaid card account. Otherwise, check guarantor entity 108 sends a notification message that indicates the rejection of the check image to the initiating deposit point.

In some embodiments, a load request is included in a web based service message that is sent from an acquiring entity to central switch node 108. For example, the load request may include a "Payment To" transaction request message that is communicated from a web portal used by the acquiring entity over an Internet connection in accordance with an application programming interface (API). The API may be established and supported by central switch node 108. Utilization of the API enables central switch node 108 to parse and process web based service messages (e.g., hypertext transfer protocol (HTTP) extensible markup language (XML) messages) send sent by acquiring entities, such as check guarantor entity 108 and cash transfer entity 109.

In some embodiments, central switch node 110 serves as a switching point that utilizes existing processing messages and transaction codes of an existing network infrastructure to facilitate the efficient deposit of funds into a prepaid card account. Exemplary components of central switch node 110 are depicted in greater detail in FIG. 2. One non-limiting example of a central switch node may include a processing hub or network element associated with a MasterCard rePower Load Network, a service from MasterCard International Incorporated of Purchase, N.Y., USA, which facilitates the adding of money to eligible prepaid card accounts. Although FIG. 1 depicts central switch node 110 as a single network element, central switch node 110 may include a plurality of network elements, a plurality of network components, and/or a network itself (e.g., a MasterCard Network) without departing from the scope of the present subject matter.

Figure 2:
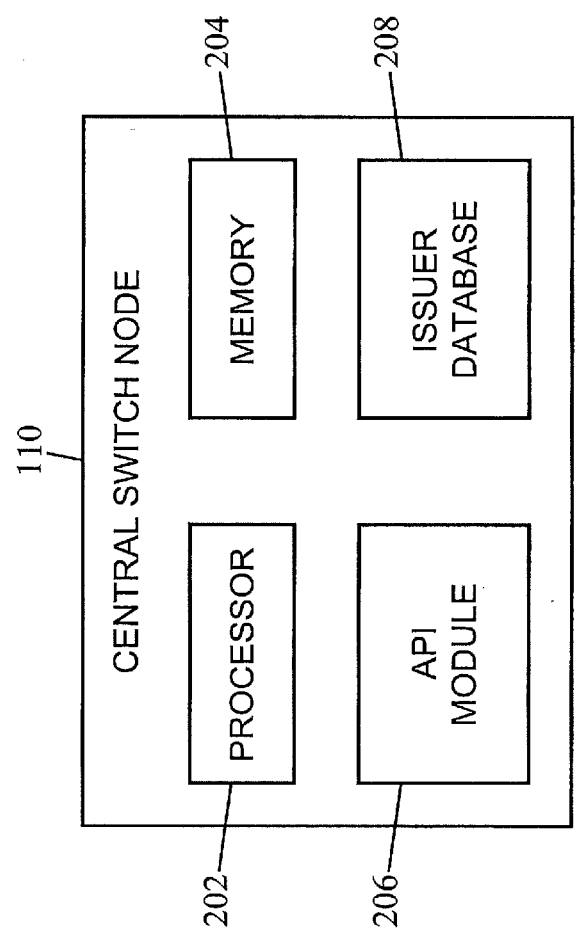
FIG. 2 is a block diagram illustrating an exemplary central switch node configured to facilitate a remote deposit to a prepaid card account according to an embodiment of the subject matter described herein.

Referring to FIG. 2, central switch node 110 includes a processor 202, a memory 204, an API module 206, and an issuer database 208. Processor 202 may include a microprocessor, central processing unit (CPU), or any other like hardware based processor unit. Memory 204 may include one or more of the following random access memory (RAM), read only memory (ROM), optical read/write memory, cache memory, magnetic read/write memory, flash memory, and the like. Processor 202 and memory 204 may be used to execute and manage the operation of API module 206. In some embodiments, API module 206 may include a software or firmware based component that facilitates the receiving and processing of web-based service messages (e.g., messages containing load requests) from acquiring entities as described herein. Similarly, API module 206 may be configured to parse the received web-based service messages to extract a customer identifier or an account information identifier that can be used to query issuer database 208, which may be configured to contain a plurality of entries that include a plurality of issuing entity addresses or identities mapped to a respective plurality of identifiers (e.g., a bank identification number (BIN)). For example, a BIN may be extracted from a received web-based service message by API module 206 and used to query and acquire an address (e.g., an IP address) of an appropriate issuing entity from database 208. Once the address of the issuing entity is determined, API module 206 may either convert the web-based service message to a format recognizable by the destination issuing entity or generate a new compatible message containing the load request that is to be delivered to the issuing entity (e.g., issuing entity 112 as shown in FIG. 1). In one embodiment, the converted message or the newly generated message containing the load request may be formatted by API module 206 in accordance to standard ISO 8583.

Referring back to FIG. 1, issuing entity 112 may receive the load request from central switch node 110. Issuing entity 112 may include a server or other computer device that is configured to manage prepaid card accounts and receive load requests associated with the prepaid card accounts. Issuing entity 112 may be associated with a bank, a credit card company, or any other issuer processor capable of depositing funds to a hosted and/or managed prepaid card account. Notably, the load request from central switch node 110 to issuing entity 112 may be communicated over a pre-existing architecture that utilizes existing processing and transaction codes. For example, the load request received by issuing entity 112 may be identified by a Payment Transaction processing code (e.g., DE 3=28) that is known by both central switch node 110 and issuing entity 112. Issuing entity 112 may also be configured to approve load requests and post the check amount to a cardholder's prepaid account.

After approving and processing the load request, the issuing entity immediately increased the prepaid card account balance and generates a response message containing the updated account balance information. In one embodiment, issuing entity 112 directs the response message to the acquiring entity (i.e., check guarantor entity 108 in this example) via central switch node 110. Once the acquiring entity receives the response message, the response message and/or the load transaction information contained in the response message is communicated to the initial deposit point utilized by the prepaid cardholder. In one embodiment, the load transaction information contained in the response message may include an electronic receipt detailing the amount loaded to the prepaid card account.

After the above load transaction phase is completed, a check clearing phase and check settlement phase related to the deposited check amount may be conducted. Notably, a clearance phase conducted by the check guarantor entity (e.g., check guarantor entity 108) and the Federal Reserve system may be executed in accordance with conventional methods. Similarly, the settlement process may be conducted in a conventional matter among the check guarantor entity, the central switch node, and the issuing entity, and an acquiring entity or member service provider that manages a settlement account that may be used to hold deposited cleared check funds. Although some relationship exists with the disclosed load transaction phase, the manner in which the check clearing phase and the settlement phase is subsequently conducted is beyond the scope of the present subject matter.

Figure 3:
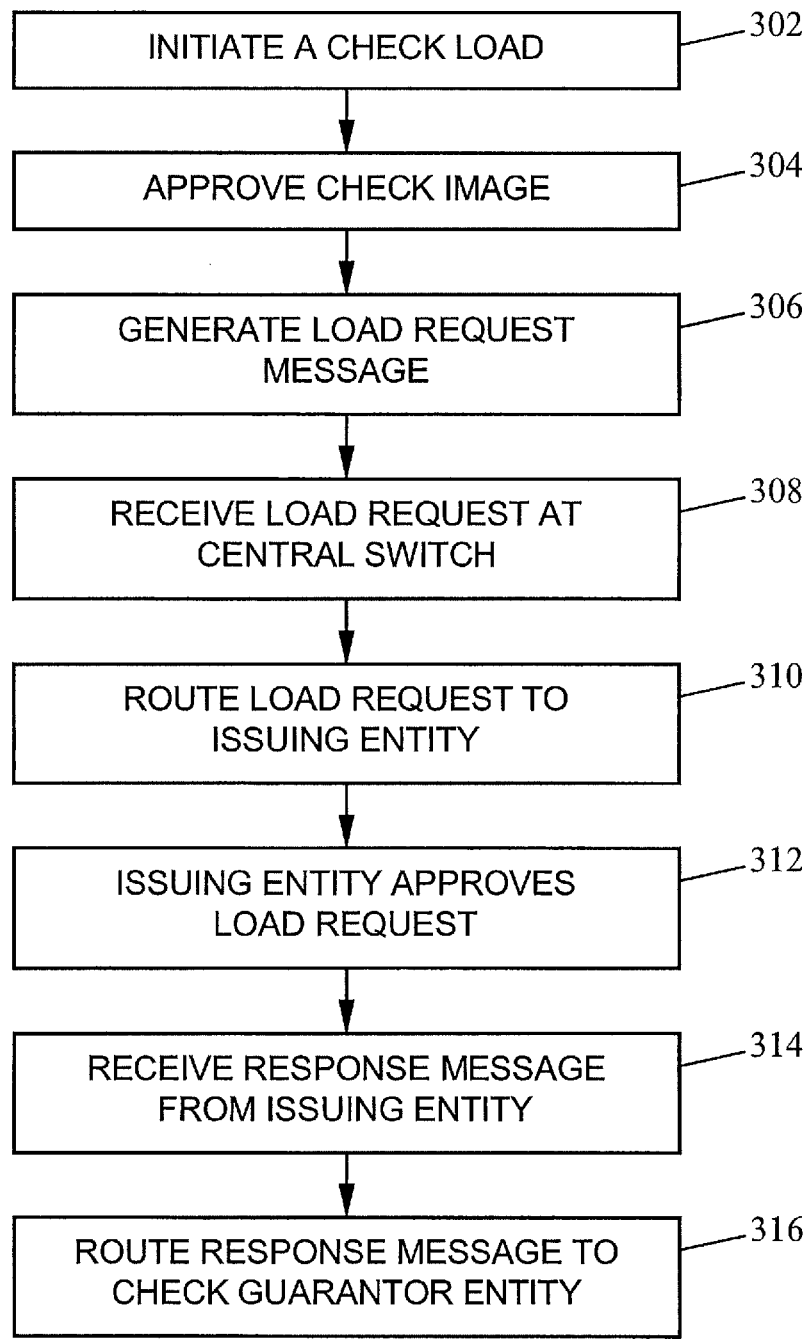
FIG. 3 is a flow chart illustrating an exemplary process for facilitating a remote deposit to a prepaid card account according to an embodiment of the subject matter described herein.

FIG. 3 is a flow chart illustrating an exemplary method 300 for facilitating a remote deposit to a prepaid card account according to an embodiment of the subject matter described herein. Although the following flow chart is directed to utilizing a check guarantor entity to facilitate a check deposit to a prepaid card account, other methods for loading funds (e.g., a cash transfer entity) may also be conducted without departing from the scope of the present subject matter.

In step 302, a check loading process is initiated. In some embodiments, a user of a mobile device may utilize an image capturing component (e.g., a camera or video camera) on the mobile device to capture the image of a check to be deposited. The image of the check to be deposited is then communicated (either via a wireless or wired communications connection) to a risk management entity for processing and approval.

In step 304, the check image is approved. In some embodiments, the check guarantor entity may process the check image using risk management algorithms and may determine that the associated check is approved for deposit.

In step 306, a load request is generated. In some embodiments, the check guarantor entity may be configured to generate a web based service message containing a load request (e.g., a Payment To transaction request) for depositing check funds into a prepaid card account upon approval of the received check image. The check guarantor entity may then route the web based service message containing the load request to a central switch node. An exemplary request message generated by an acquiring entity, such as the check guarantor entity, is depicted in FIG. 4, Although FIG. 4 illustrates an XML request message, the request message may be generated in any web based protocol, format, or specification without departing from the scope of the present subject matter.

In step 308, the load request is received. In some embodiments, the central switch node receives, via an API, the web based service message containing the Payment To transaction request communicated by the check guarantor entity. Upon receiving the load request, the central switch node may extract a BIN contained in the load request to query an issuer database to identify the address of a destination issuing entity.

In step 310, the load request is routed to an issuing entity. In one embodiment, the central switch node may route the Payment To transaction request to an appropriate issuing entity for approval by converting the web based service message into a format recognizable by the issuing entity. In another embodiment, the central switch node may route the Payment To transaction request to an appropriate issuing entity for approval by generating a new message in a format recognizable by the issuing entity. In both instances, the message routed to the issuing entity includes the load request.

In step 312, the load request is approved. In some embodiments, the issuer processor may identify process the load request, which may be identifiable by the Payment Transaction processing code (DE 3=28). The issuer processor may approve the load request and deposit the associated monetary amount to the cardholder's prepaid account. After the approval processing is completed, the issuing entity may generate a response message containing the cardholder's updated account balance.

In step 314, the response message is received from the issuing entity. In some embodiments, the response message containing the cardholder's updated account balance is received by the central switch node. An exemplary response message received from the issuing entity is depicted in FIG. 5. Although FIG. 5 illustrates an XML response message, the response message may be formatted in accordance to any protocol, format, or specification without departing from the scope of the present subject matter.

In step 316, the response message is forwarded. In one embodiment, the central switch node routes the response message to the card guarantor entity, which in turn sends the response message (and/or the updated account balance information) to the deposit point originally used by the prepaid cardholder.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for facilitating a remote deposit to a prepaid card account, the method comprising:
receiving, via an application programming interface (API) supported by a central switch node, a web based service message containing a load request from an acquiring entity, wherein the web based service message is not an ISO 8583 message;
utilizing, at the central switch node, the load request to identify an issuing entity that hosts a prepaid card account associated with the load request from among a plurality of issuing entities; and
communicating the load request from the central switch node to the issuing entity, wherein the load request is communicated to the issuing entity is included in an ISO 8583 message originating from the central switch node.

2. The method of claim 1 wherein the web service message includes an extensible markup language (XML) message.

3. The method of claim 1 wherein the load request includes a Payment To transaction request message.

4. The method of claim 1 wherein the load request includes an original credit transaction (OCT) message.

5. The method of claim 1 wherein the acquiring entity utilizes a web portal to communicate the web based service message to the central switch node.

6. The method of claim 1 wherein the central switch node comprises a plurality of network elements.

7. The method of claim 1 wherein the issuing entity includes at least one of a bank entity and a program manager entity.

8. The method of claim 1 wherein communicating the load request includes converting the web based service message to the ISO 8583 message that includes the load request.

9. The method of claim 1 wherein communicating the load request includes generating the ISO 8583 message that includes the load request.

10. The method of claim 1 wherein utilizing the load request to identify an issuing entity includes extracting a bank identifier number (BIN) included in the load request to query a database containing the identity and an address of the issuing entity.

11. The method of claim 1 wherein the acquiring entity includes a check guarantor entity.

12. The method of claim 11 wherein the check guarantor entity is configured to receive an image of a check to be deposited in the prepaid card account from at least one of an automated teller machine (ATM), a mobile device, a merchant kiosk, and a point of sale reader device.

13. A system for facilitating a remote deposit to a prepaid card account, the system comprising:
an acquiring entity configured to send a web based service message containing a load request, wherein the web based service message is not an ISO 8583 message; and
a central switch node configured to receive the web based service message containing a load request via a supported application programming interface (API), to utilize the load request to identify an issuing entity that hosts a prepaid card account associated with the load request from among a plurality of issuing entities, and to communicate the load request to the issuing entity, wherein the load request is communicated to the issuing entity is included in an ISO 8583 message originating from the central switch node.

14. The system of claim 13 wherein the web service message includes an extensible markup language (XML) message.

15. The system of claim 13 wherein the load request includes a Payment To transaction request message.

16. The system of claim 13 wherein the load request includes an original credit transaction (OCT) message.

17. The system of claim 13 wherein the acquiring entity utilizes a web portal to communicate the web based service message to the central switch node.

18. The system of claim 13 wherein the central switch node comprises a plurality of network elements.

19. The system of claim 13 wherein the issuing entity includes at least one of a bank entity and a program manager entity.

20. The system of claim 13 wherein the central switch node is further configured to convert the web based service message to the ISO 8583 message that includes the load request.

21. The system of claim 13 wherein the central switch node is further configured to generate the ISO 8583 message that includes the load request.

22. The system of claim 13 wherein the central switch node is further configured to utilize extracting a bank identifier number (BIN) included in the load request to query a database containing the identity and an address of the issuing entity.

23. The system of claim 13 wherein the acquiring entity includes a check guarantor entity.

24. The system of claim 23 wherein the check guarantor entity is configured to receive an image of a check to be deposited in the prepaid card account from at least one of an automated teller machine (ATM), a mobile device, a merchant kiosk, and a point of sale reader device.

25. A non-transitory computer readable medium having stored thereon executable instructions for controlling a computer to perform steps comprising:
receiving, via an application programming interface (API) supported by a central switch node, a web based service message containing a load request from an acquiring entity, wherein the web based service message is not an ISO 8583 message;
utilizing, at the central switch node, the load request to identify an issuing entity that hosts a prepaid card account associated with the load request from among a plurality of issuing entities; and
communicating the load request from the central switch node to the issuing entity, wherein the load request is communicated to the issuing entity is included in an ISO 8583 message originating from the central switch node.

* * * * *